(12) United States Patent
Mabry et al.

(10) Patent No.: US 12,086,044 B2
(45) Date of Patent: Sep. 10, 2024

(54) METHODS AND SYSTEMS FOR MONITORING COMPUTING PROCESSES

(71) Applicant: Capital One Services, LLC, McLean, VA (US)

(72) Inventors: Mark Mabry, Glen Allen, VA (US); Richard Shi, Henrico, VA (US); Arindam Chakraborty, Glen Allen, VA (US); Thomas Hayghe, Amelia, VA (US); Sovon Nath, Glen Allen, VA (US); Naresh Adhikari, Glen Allen, VA (US); Aniket Sinkar, Glen Allen, VA (US)

(73) Assignee: Capital One Services, LLC, McLean, VA (US)

(\*) Notice: Subject to any disclaimer, the term of this patent is extended or adjusted under 35 U.S.C. 154(b) by 894 days.

(21) Appl. No.: 17/163,622

(22) Filed: Feb. 1, 2021

(65) Prior Publication Data

US 2022/0245044 A1 Aug. 4, 2022

(51) Int. Cl.
*G06F 11/30* (2006.01)
*G06F 9/445* (2018.01)
*G06N 3/08* (2023.01)
*G06N 5/025* (2023.01)

(52) U.S. Cl.
CPC ...... *G06F 11/3072* (2013.01); *G06F 9/44505* (2013.01); *G06F 11/3051* (2013.01); *G06N 3/08* (2013.01); *G06N 5/025* (2013.01)

(58) Field of Classification Search
None
See application file for complete search history.

(56) References Cited

U.S. PATENT DOCUMENTS

| 7,386,586 | B1* | 6/2008 | Headley | G06F 9/5033 |
| | | | | 709/201 |
| 2003/0084428 | A1* | 5/2003 | Agostini | G06Q 40/04 |
| | | | | 717/115 |
| 2019/0129765 | A1* | 5/2019 | Dubodelov | G06F 21/629 |
| 2019/0155533 | A1 | 5/2019 | Das et al. | |
| 2021/0279208 | A1* | 9/2021 | Higgins | G06F 16/168 |

\* cited by examiner

*Primary Examiner* — Qing Chen
(74) *Attorney, Agent, or Firm* — Bookoff McAndrews, PLLC (57) ABSTRACT

Disclosed are methods and systems for monitoring a computing process. For instance, the method may include: receiving a rules file including a set of rules for monitoring the computing process; receiving a configuration file for processing the rules file; retrieving a data set including a plurality of records associated with the computing process based on one or more sources of data included in the received configuration file; filtering the retrieved data set by applying one or more filter queries included in the received configuration file to the retrieved data set; applying the set of rules included in the received rules file to the filtered data set; and generating an output indicating results of applying the set of rules to the filtered data set.

20 Claims, 5 Drawing Sheets

METHODS AND SYSTEMS FOR MONITORING COMPUTING PROCESSES

TECHNICAL FIELD

Various embodiments of the present disclosure relate generally to methods and systems for monitoring computing processes.

BACKGROUND

There exists a need for a single configurable platform that provides efficient and effective data validation for data driven entities.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for monitoring computing processes. For instance, a method may include receiving, by one or more processors, a rules file including a set of rules for monitoring a computing process, wherein the set of rules comprises a set of static rules for performing a static check of the computing process or a set of dynamic rules for performing a dynamic check of the computing process; receiving, by the one or more processors, a configuration file for processing the rules file, wherein the configuration file includes information indicating one or more sources of data associated with the computing process, one or more filter queries for identifying data associated with the computing process, and a location of the rules file; retrieving, by the one or more processors, a data set including a plurality of records associated with the computing process based on the one or more sources of data included in the received configuration file; filtering, by the one or more processors, the retrieved data set by applying the one or more filter queries included in the received configuration file to the retrieved data set; applying, by the one or more processors, the set of rules included in the received rules file to the filtered data set; and generating, by the one or more processors, an output indicating results of applying the set of rules to the filtered data set.

A computer system may include a data storage device storing processor-readable instructions; and a processor configured to execute the instructions to perform a method. The method may include receiving a rules file including a set of rules for monitoring a computing process, wherein the set of rules comprises a set of static rules for performing a static check of the computing process or a set of dynamic rules for performing a dynamic check of the computing process; receiving a configuration file for processing the rules file, wherein the configuration file includes information indicating one or more sources of data associated with the computing process, one or more filter queries for identifying data associated with the computing process, and a location of the rules file; retrieving a data set including a plurality of records associated with the computing process based on the one or more sources of data included in the received configuration file; filtering the retrieved data set by applying the one or more filter queries included in the received configuration file to the retrieved data set; applying the set of rules included in the received rules file to the filtered data set; and generating an output indicating results of applying the set of rules to the filtered data set.

A method may include receiving, by one or more processors, a first rules file including a set of static rules for monitoring a computing process; receiving, by the one or more processors, a first configuration file for processing the first rules file, wherein the first configuration file includes information indicating one or more sources of data associated with the computing process, one or more filter queries for identifying data associated with the computing process, a location of the first rules file, and an indication for a static rule check based on the first rules file; receiving, by one or more processors, a second rules file including a set of dynamic rules for monitoring the computing process; receiving, by the one or more processors, a second configuration file for processing the second rules file, wherein the second configuration file includes information indicating one or more sources of data associated with the computing process, one or more filter queries for identifying data associated with the computing process, a location of the second rules file, and an indication for a dynamic rule check based on the second rules file; monitoring, by the one or more processors, the computing process according to a first schedule based on the first rules file and the first configuration file; and monitoring, by the one or more processors, the computing process according to a second schedule based on the second rules file and the second configuration file. In some embodiments, the computing process may be monitored according to the first schedule by retrieving, by the one or more processors, a first data set including a plurality of records associated with the computing process based on the one or more sources of data included in the received first configuration file; filtering, by the one or more processors, the retrieved first data set by applying the one or more filter queries included in the received first configuration file to the retrieved data set; applying, by the one or more processors, the set of static rules included in the received first rules file to the filtered first data set, and generating, by the one or more processors, a first output indicating results of applying the set of static rules to the filtered first data set. In some embodiments, the computing process may be monitored according to the second schedule by retrieving, by the one or more processors, a second data set including a plurality of records associated with the computing process based on the one or more sources of data included in the received second configuration file; filtering, by the one or more processors, the retrieved second data set by applying the one or more filter queries included in the received second configuration file to the retrieved data set; applying, by the one or more processors, the set of dynamic rules included in the received second rules file to the filtered second data set, and generating, by the one or more processors, a second output indicating results of applying the set of dynamic rules to the filtered second data set.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for monitoring a computing process.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
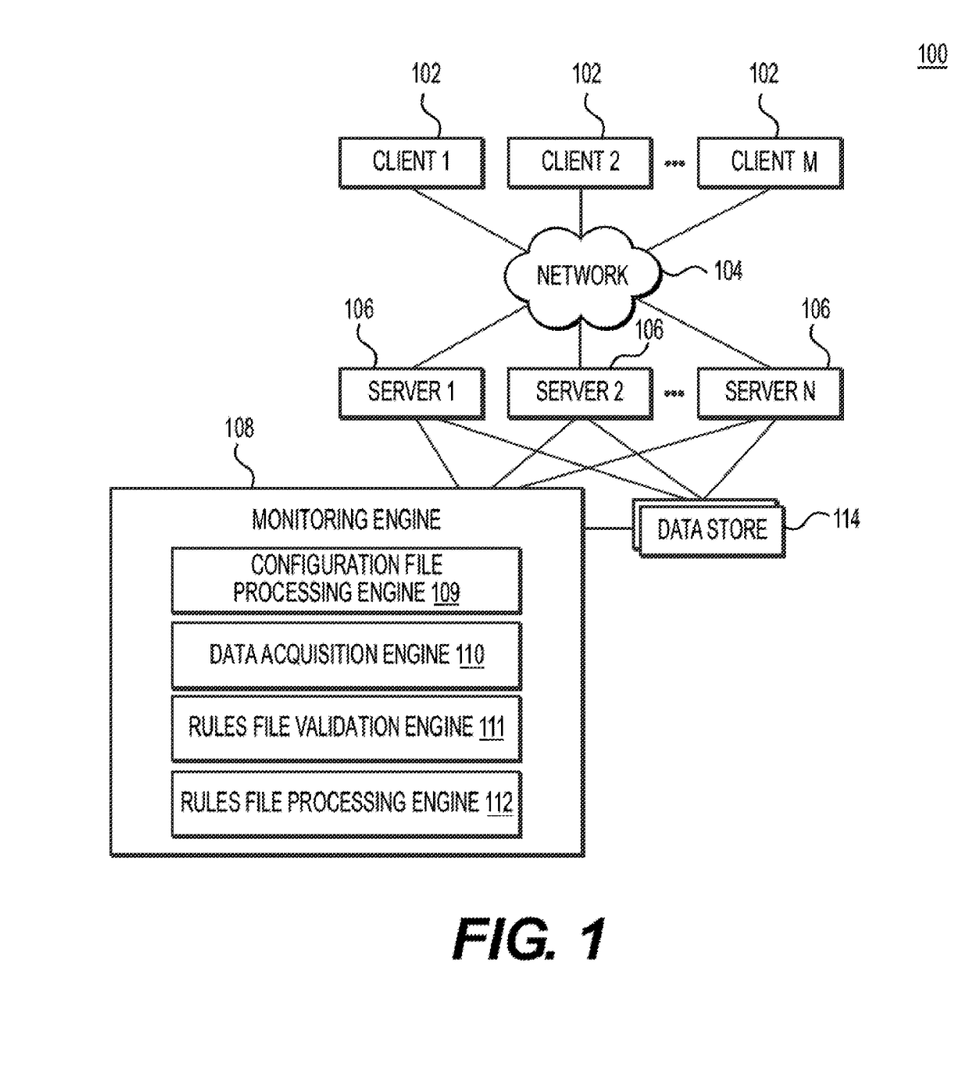
FIG. 1 depicts an exemplary block diagram of a system for monitoring computing processes, according to one or more embodiments.

Referring now to the figures, FIG. 1 shows a block diagram of an exemplary electronic communications system 100 for implementing embodiments of the present disclosure (e.g., for monitoring computing processes), or aspects thereof. In some embodiments, the system 100 may include clients 102, servers 106, data store 114, and a monitoring engine 108, all connected via network 104. System 100 may include one or more clients 102 (e.g., Client 1, Client 2, . . . Client M). Clients 102 may be implemented with devices, and/or applications running thereon. By way of example, clients 102 each may be a computing device consistent with or similar to that depicted in FIG. 5, including personal computers, laptops, tablet computers, personal digital assistants, mobile telephones, smartphones, pagers, and/or other types of electronic communication devices. Clients 102 may be configured to communicate with other entities in the system 100 via the network 104. In certain embodiments, network 104 may include any combination of communications networks. For example, network 104 may include the Internet and/or another type of wide area network, an intranet, a metropolitan area network, a local area network, a wireless network, a cellular communications network, etc. In some embodiments, clients 102 may be configured to submit a request to monitor computing processes. The request may be generated by clients 102 and transmitted through network 104 via appropriate servers (e.g., servers 106) to the monitoring engine 108. In such embodiments, the request may include a configuration file and a rules file, as will be described in further detail below.

Servers 106 may include one or more servers (e.g., Server 1, Server 2, . . . Server N) configured to interact with the network 104, one or more data stores 114, and the monitoring engine 108. By way of example, servers 106 may be computing devices consistent with or similar to that depicted in FIG. 5. In addition, consistent with some embodiments, servers 106 may be implemented as a single server, a server system comprising a plurality of servers, or a server farm comprising a load balancing system and a plurality of servers. Servers 106 may be hardware, software, or a combination thereof. In some embodiments, a product and/or service may be provided to the client 102 via the servers 106. For example, the servers 106 may be configured to execute models and/or business processes.

The monitoring engine 108 may be configured to monitor one or more computing processes based on a configuration file and a rules file, as will be explained in further detail below. In some embodiments, the one or more computing processes may be associated with model execution. In other words, the monitoring engine 108 may be configured to monitor model execution. In the context of the current disclosure, a model may refer to a quantitative method or algorithm that processes various inputs to generate quantitative outputs, e.g., estimates and/or predictions. For example, a model may apply statistical, economic, financial, mathematical theories, and/or assumptions to process input data into quantitative outputs. In some embodiments, models may carry a certain amount of risk that may need to be managed and mitigated. Model execution monitoring may be advantageous for such risk management and mitigation. As will be described in further detail below, model execution monitoring may be performed by executing automated checks on the model input and output data and providing timely notification to a user based on the checks. In some embodiments, the computing processes may be associated with business processes. That is, the methods and systems disclosed herein may be used for monitoring business processes.

As shown in FIG. 1, the monitoring engine 108 may include a configuration file processing engine 109, a data acquisition engine 110, a rules file validation engine 111, and a rules file processing engine 112, according to some embodiments. In some examples, the monitoring engine 108 may comprise a cloud computing platform with scalable resources for computation and/or data storage, and may run one or more applications on the cloud computing platform to perform various computer-implemented methods described in this disclosure. In some embodiments, the monitoring engine 108 may be associated with cloud networks such as an object storage service and/or a notification system. It is understood that any storage service may be utilized by the monitoring engine 108 such as object, block, and/or relational/non-relational databases. While a cloud network storage service is described, it is also understood that the storage service may be provided on local servers, e.g., server 106. Additionally, it is understood that any notification service may be utilized such as the aforementioned cloud network notification service and/or third party provided notification services. In some instances, the monitoring engine 108 may utilize the cloud network notification system to generate and transmit notifications based on the monitored computing process. By way of example, the monitoring engine 108 may be a computing device consistent with or similar to that depicted in FIG. 5

The configuration file processing engine 109 may be configured to receive and process a configuration file for monitoring the one or more computing processes. In some embodiments, the configuration file may be generated in a human-readable data-serialization language, e.g., YAML. The configuration file may include information indicating a data component associated with the one or more computing processes (e.g., data relevant to monitoring the computing processes). For example, one or more data sources (e.g., client 102, server 106, and/or data store 114) for data associated with the one or more computing processes may be defined in the configuration file. The configuration file may further include information indicating a rules component associated with monitoring the one or more computing processes. For example, the configuration file may include a path to a rules file and an indication regarding what type of rules check may be performed based on the rules file, as will be described in further detail below. In some embodiments, the configuration file may be customized by a user to process a user customized rules file.

The data acquisition engine 110 may be configured to obtain the data and rules file based on the configuration file. For example, the data acquisition engine 110 may retrieve the rules file based on the path to the rules file indicated in the configuration file. As another example, the data acquisition engine 110 may retrieve the data from the one or more data sources defined in the configuration file. In some embodiments, the data acquisition engine 110 may be further configured to apply filters to the retrieved data based on one or more filter queries included in the configuration file. Accordingly, the retrieved data may be filtered to obtain data relevant to monitoring the computing process.

The rules file validation engine 111 may be configured to validate the rules file. In some embodiments, the rules file validation engine 111 may obtain the path to the rules file, e.g., the path to the rules file included in the configuration file, in order to validate the rules file. In some embodiments, the rules file validation engine 111 may validate the rules file obtained by the data acquisition engine 110 based on the path to the rules file indicated in the configuration file. In some embodiments, the rules file validation engine 111 may perform the validation based on a single script (hereinafter referred to as a "validating script"). The validating script may read and validate the rules included in the rules file. In some embodiments, the validating script may be updated periodically and/or as needed with the most recent validation rules. In some embodiments, the rules file validation engine 111 may generate a notification based on a determination that any of the rules are invalid. For example, the rules file validation engine 111 may list the invalid rules and provide the associated details. In some embodiments, the rules file may be processed by the rules file processing engine 112 based on a successful validation of the rules file via the riles file validation engine 111.

The rules file processing engine 112 may be configured to process the rules file for monitoring the one or more computing processes. The rules file may define the various rules to be applied to the one or more computing processes. For example, the rules file may define the various rules to be applied to the data associated with the one or more computing processes obtained by the data acquisition engine 110. The rules file may be directed to a static check or a dynamic check. In some embodiments, the rules file may include a list of static rules for a static check of the one or more computing processes or a list of dynamic rules for a dynamic check of the one or more computing processes. In some embodiments, the rules file may include a list of user customized rules.

The rules file processing engine 112 may perform a static check of the specific computing process based on a list of static rules. For static checks, the rules file processing engine 112 may individually check each record (e.g., a piece of data in JSON format) included in the obtained data associated with the specific computing process based on the static rules.

In some embodiments, the static check may utilize one or more attribute files. In such embodiments, the rules file processing engine 112 may retrieve (e.g., via the data acquisition engine 110) the relevant attribute file. In the context of the current disclosure, an attribute file may define (e.g., defining a name and/or location for each attribute) which attributes included in each record need to be copied after checking the records. In some embodiments, the attributes file may further include a list of folders that must be navigated in order to find the attributes.

The rules file processing engine 112 may perform a dynamic check of the one or more computing processes based on a list of dynamic rules. For dynamic checks, the rules file processing engine 112 may aggregate the obtained data associated with the specific computing process and check the aggregated data based on one or more predetermined thresholds. In some embodiments, the amount of aggregated data may depend on how often the dynamic checks are run. For example, data obtained since the previous dynamic check may be aggregated for a next dynamic check. In some instances, a dynamic check may be performed daily. In such instances, the aggregated data may be a day's worth of data.

Figure 2:
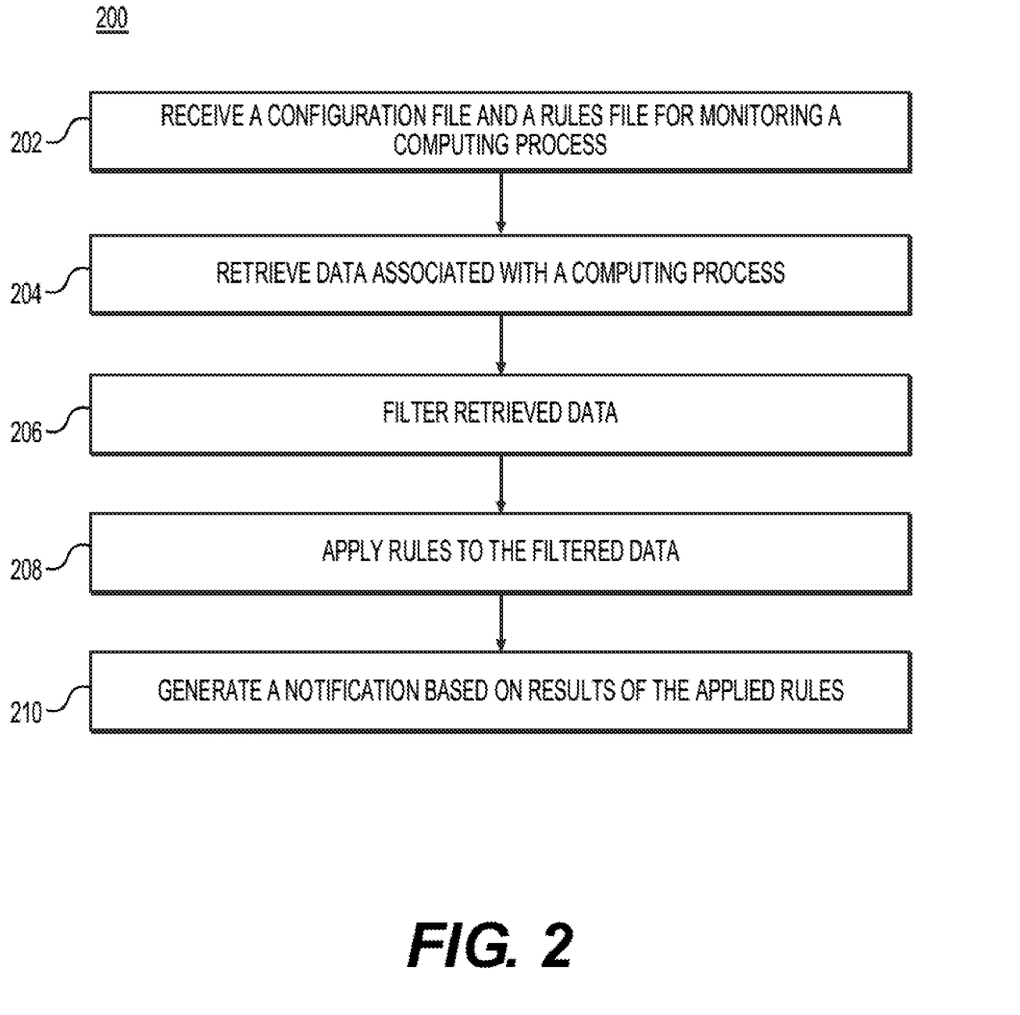
FIG. 2 depicts a flowchart of a method for monitoring computing processes, according to one or more embodiments.

FIG. 2 depicts a flowchart of a method 200 for monitoring computing processes, according to one or more embodiments.

Method 200 may begin with step 202 in which the monitoring engine 108 may receive a configuration file and a rules file for monitoring a computing process. While method 200 is described with reference to one configuration file and one rules file, it is understood that more than one configuration file and/or more than one rules file may be utilized by the monitoring engine 108 to monitor the computing process. It is also understood that any number of configuration and rules files may be utilized by the monitoring engine 108 to monitor one or more computing processes.

As explained above, the configuration file may include information indicating one or more sources (e.g., client 102, server 106, and/or data store 114) for data associated with the computing process. The configuration file may further include information directed to filtering the data associated with the computing process, as will be explained in further detail below with reference to step 206. In some embodiments, the configuration file may include a path to the rules file and an indication regarding what type of rules check is to be performed based on the rules file. For example, the configuration file may indicate that the rules file includes a listing of static rules for a static check or a listing of dynamic rules for a dynamic check. In some embodiments, the configuration file may also indicate when and how often (collectively referred to as "cadence") to perform the rules check. In some embodiments, the rules check may be performed on demand instead of being performed on a regular schedule. In some embodiments, the configuration file may further include information indicating where to store the results from the rules check, e.g., from monitoring the computing process. For example, the configuration file may define an alert mechanism, e.g., via a notification system. The rules file may include one or more rules associated with monitoring the computing process. In some embodiments, the rules file may include a list of static rules for a static check or a listing of dynamic rules for a dynamic check.

In step 204, the monitoring engine 108 may retrieve data associated with the computing process, e.g., via data acquisition engine 110. In some embodiments, the monitoring engine 108 may retrieve data associated with the computing process from the one or more data sources indicated in the received configuration file. The data may be retrieved in AVRO, Parquet, and/or Session Description Protocol (SDP) format.

In step 206, the monitoring engine 108 may filter the retrieved data to obtain data relevant to monitoring the computing process. In some embodiments, the filtering may be performed based on one or more filter queries (e.g., SQL statements) included in the configuration file. For example, the filtering may be performed based on a SQL statement including a join with an additional data source.

In step 208, the monitoring engine 108 may apply rules included in the rules file to the filtered data for effective monitoring of the computing process. In some embodiments, the rules may be validated prior to applying to the filtered data. That is, the monitoring engine 108 may apply the validated rules to the filtered data. In some embodiments, the monitoring engine 108 may include syntactical validation logic that may be used to parse and validate the rules included in the rules file.

As explained above, the rules may comprise a list of static rules for a static check of the filtered data or a list of dynamic rules for a dynamic check of the filtered data. For static checks, the monitoring engine 108 may apply the static rules by reading each record individually and flagging individual records that do not fit the criteria, i.e., that do not comply with the static rules. As will be explained in further detail below, static rules may handle not null, not empty, is value, not value, real range, and integer range checks.

For dynamic checks, the monitoring engine 108 may aggregate the filtered data and form flags based on one or more thresholds, thereby considering the filtered data as a whole as opposed to considering each individual piece of data. In some embodiments, each dynamic rule may have multiple thresholds, each of which may be checked individually as will be described in further detail below. Such static rules and/or dynamic rules may be predetermined rules. In some embodiments, the rules applied in step 208 may be customized. Such customized rules may be written and tested in, by way of example, Python.

In step 210, the monitoring engine 108 may generate a notification based on results of the applied rules. In some embodiments, the notification may be sent via email. For example, the email may include a summary of failed rules.

In some embodiments, the monitoring engine 108 may save the results of the applied rules to a database, e.g., data store 114 and/or a cloud based storage. The monitoring engine 108 may store the results along with the associated metadata. For example, the monitoring engine 108 may store the segment, the monitored computing process, the period of the checks, the number of records (e.g., pieces of data) loaded and in the segment, the date that the records (e.g., the pieces of data) were checked and the date the rules were applied to the record (e.g., the date that the records were validated by the monitoring engine 108), and/or the start and stop times of the rule application.

In some embodiments, the stored results may vary depending on whether the conducted check was a static check or a dynamic check. For example, the results may be stored as static data or dynamic data depending on the type of check that was performed. Static data may be stored as a list of each record. For each record, the monitoring engine 108 may store attributes captured and rules checked. In some embodiments, each attribute may have the original value, and the checked rules may be provided as either passed or failed. In some embodiments, the static data may be stored as a static table. The static table may provide a number of rows equal to the number of rules that have failed for each record. In some embodiments, each record may be allocated a unique identifier. In such embodiments, each row may include the unique identifier for the record and the name of the associated failed rules. Each row may contain the contents of the record (e.g., the JSON blob of the record) including the failed rules and the copied attributes.

In some embodiments, the static table may record the following columns on each static check (also referred to as a run of a static job): (1) the name of the segment and monitored computer process; (2) time of execution; (3) unique identifier of the record (e.g., the identifier of the record on which the static check was performed); (4) the month of the record on which the static check was performed; (5) the day of the record on which the static check was performed; (6) the hour of the record on which the static check was performed; (7) an identifier allocated to the rule; and (8) the details of the record, for example, as a JSON structure.

Dynamic data may be stored with information associated with each rule. For example, such information may include the name of a rule, the actual value of the rule, and whether or not the rule was flagged. In some embodiments, the dynamic data may be stored as a dynamic table. The dynamic table may provide a number of rows where each row includes a rule name, an actual value of the rule, and the upper and lower boundaries of the rule. Each row may additionally include the details about the rule (e.g., the JSON blob of the data about the rule).

In some embodiments, the dynamic table may record the following columns on each dynamic check (also referred to as a run of a dynamic job): (1) the name of the segment and monitored computer process; (2) time of execution; (3) unique identifier of the record; (4) the month of the record on which the dynamic check was performed; (5) the day of the record on which the dynamic check was performed; (6) the hour of the record on which the dynamic check was performed; (7) a total of the records that were analyzed; (8) an identifier allocated to the rule; (9) a lower bound of the rule threshold; (10) an upper bound of the rule threshold; and (11) the actual computed value for the rule.

Each dynamic check calculates a value (e.g., the actual computed value for the rule) to compare to a threshold (e.g., the lower and upper bound of the dynamic rule). In some embodiments, each of these calculated values are stored in a calculation table. Accordingly, the calculation log may provide a historical log of the calculated values to determine historical trends. In some embodiments, the historical data file, e.g., the historical log, may be validated prior to determining the historical trends. In some embodiments, these historical trends may be used to automatically determine updated dynamic rules. For example, such historical trends may be utilized to automatically determine updated thresholds. In some embodiments, the monitoring engine 108 may employ neural network approaches to determine such historical trends and automatically update associated rules (e.g., static and/or dynamic rules) based on the determined trends. A neural network may be software representing the human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a single-shot detector, a convolutional neural network, a deep neural network, or a recurrent neural network.

In some embodiments, the calculation table may record details of each dynamic check including the following: (1) the name of the segment and monitored computer process; (2) unique identifier of the record; (3) starting date of data being checked; (4) ending date of data being checked; (5) starting hour of data being checked; (6) ending hour of data being checked; (7) the name of the field; (8) time of when the dynamic check was performed; (9) the name of the file; (10) the name of the dynamic rule; (11) the status of the rule (e.g., fail or pass); and (12) details of the processed rule in JSON format.

The details of each dynamic and static run may be recorded in a job log table. In some embodiments, the information stored in the job log table may include the following: (1) the name of the segment and monitored computer process; (2) unique identifier of the record; (3) starting date of data being checked; (4) ending date of data being checked; (5) starting hour of data being checked; (6) ending hour of data being checked; (7) the time when check was run; (8) how long it took to run the check; (9) the status of the check (e.g., fail or pass); (10) total number of records; (11) total number of segments; (12) version of the rule numbers; and (13) the month of the data.

In some embodiments, the stored results (e.g., the aforementioned tables) may be accessed via an open-source GUI. For example, the GUI may be a results dashboard that has a simple top-level menu. In the context of the current disclosure, a results dashboard is a configurable collection of graphs, query results tables, and text blocks. In some embodiments, queries may be input via the GUI to retrieve desired information based on the stored results. The queries may be written in PostgresQL. In such embodiments, the query output, e.g., the desired information, may be displayed below the input query. In some embodiments, a graph may be generated based on the input query.

Figure 3:
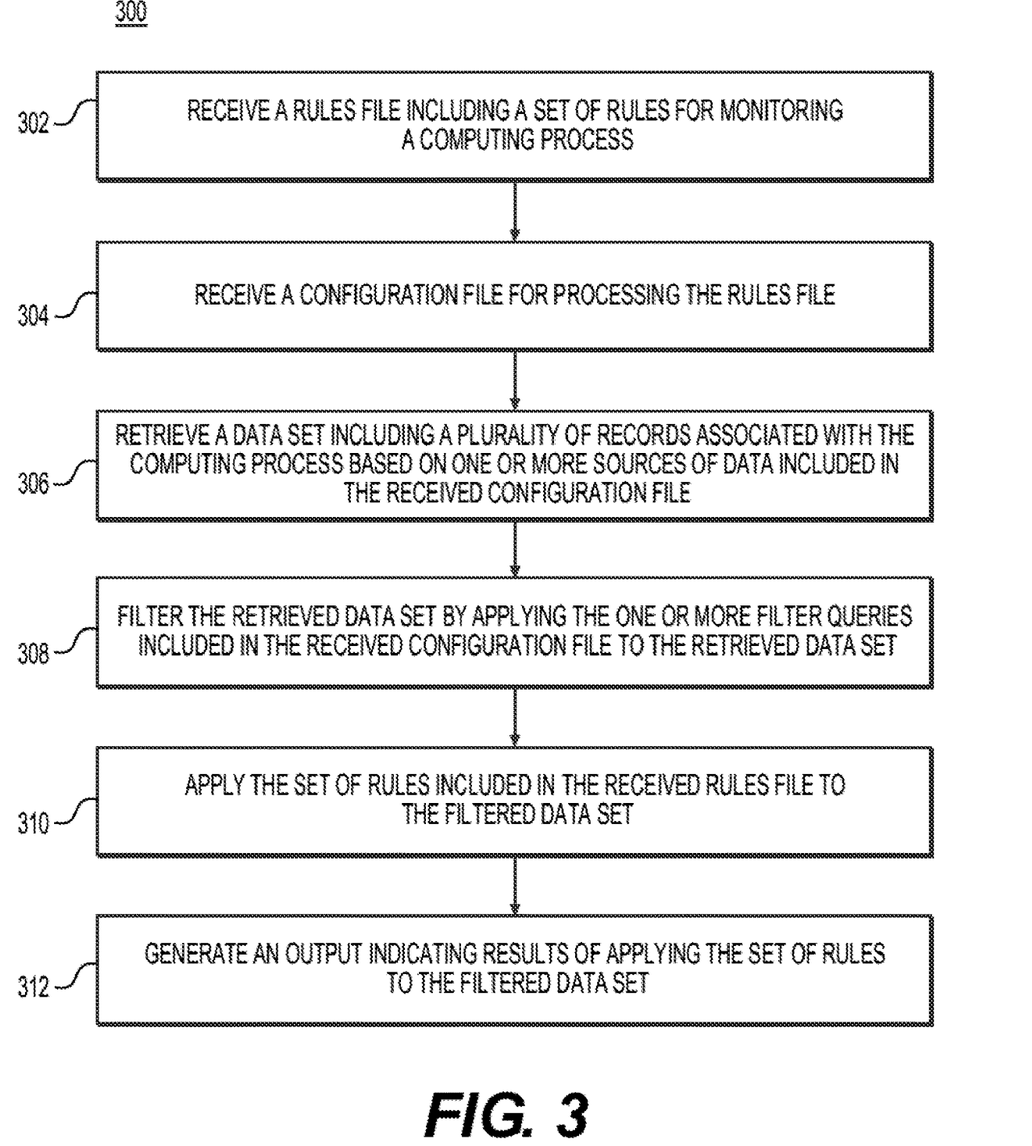
FIG. 3 depicts a flowchart of a method for monitoring computing processes, according to one or more embodiments.

FIG. 3 depicts a flowchart of a method 300 for monitoring a computing process, according to one or more embodiments.

Method 300 may begin with step 302 in which the monitoring engine 108 may receive a rules file including a set of rules for monitoring a computing process. In some embodiments, the set of rules may include a set of static rules for performing a static check of the computing process or a set of dynamic rules for performing a dynamic check of the computing process.

In step 304, the monitoring engine 108 may receive a configuration file for processing the rules file. In some embodiments, the configuration file includes information indicating one or more sources of data associated with the computing process, one or more filter queries for identifying data associated with the computing process, and a location of the rules file. In some embodiments, the configuration file may further include information indicating a format of the data to be retrieved from each of the one or more sources of data and/or a schedule indicating when and how many times data is to be retrieved from each of the one or more sources of data.

In step 306, the monitoring engine 108 may retrieve a data set including a plurality of records associated with the computing process based on the one or more sources of data included in the received configuration file. In step 308, the monitoring engine 108 may filter the retrieved data set by applying the one or more filter queries included in the received configuration file to the retrieved data set.

In step 310, the monitoring engine 108 may apply the set of rules included in the received rules file to the filtered data set. In some embodiments, the monitoring engine 108 may validate the set of rules prior to applying to the filtered data set. In such embodiments, the monitoring engine 108 may apply the set of rules to the filtered data set as a result of successfully validating the set of rules.

In some embodiments, the set of rules may include the set of static rules. In such embodiments, applying the set of rules to the filtered data set may include applying the set of static rules to each of the plurality of records included in the retrieved data set and determining whether each of the plurality of records satisfy the applied set of static rules. In some embodiments, determining whether each of the plurality of records satisfy the applied set of static rules includes: determining whether a specific data field is null and determining whether the specific data field includes a value that equals a predetermined value; and/or determining whether the specific data field includes a value that falls within a predetermined range.

In some embodiments, the set of rules may include the set of dynamic rules. In such embodiments, applying the set of rules to the filtered data set may include: aggregating data included in the retrieved data set associated with a specific data field; determining a value based on the aggregated data; and comparing the determined value to at least one predetermined threshold. In some embodiments, the at least one predetermined threshold may include a predetermined value or a predetermined range of values.

In some embodiments, method 300 may include a further step in which the monitoring engine 108 may combine one or more rules included in the set of rules using a Boolean operation and apply the combined rules to the filtered data set.

In some embodiments, method 300 may include a further step in which the monitoring engine may obtain historical data associated with the computing process. In such embodiments, a neural network may be trained based on the obtained historical data to determine trends associated with the computing process. The trained neural network may be used to determine a trend associated with the computing service. The monitoring engine 108 may then update the set of rules based on the determined trend and apply the updated set of rules to the filtered data set.

In step 312, the monitoring engine 108 may generate an output indicating results of applying the set of rules to the filtered data set. In some embodiments, generating the output may include generating a notification as a result of determining one or more failed rules and generating a list of the determined one or more failed rules.

In some embodiments, method 300 may further include a step in which the monitoring engine 108 may cause display of the generated output via a configurable user interface.

Figure 4:
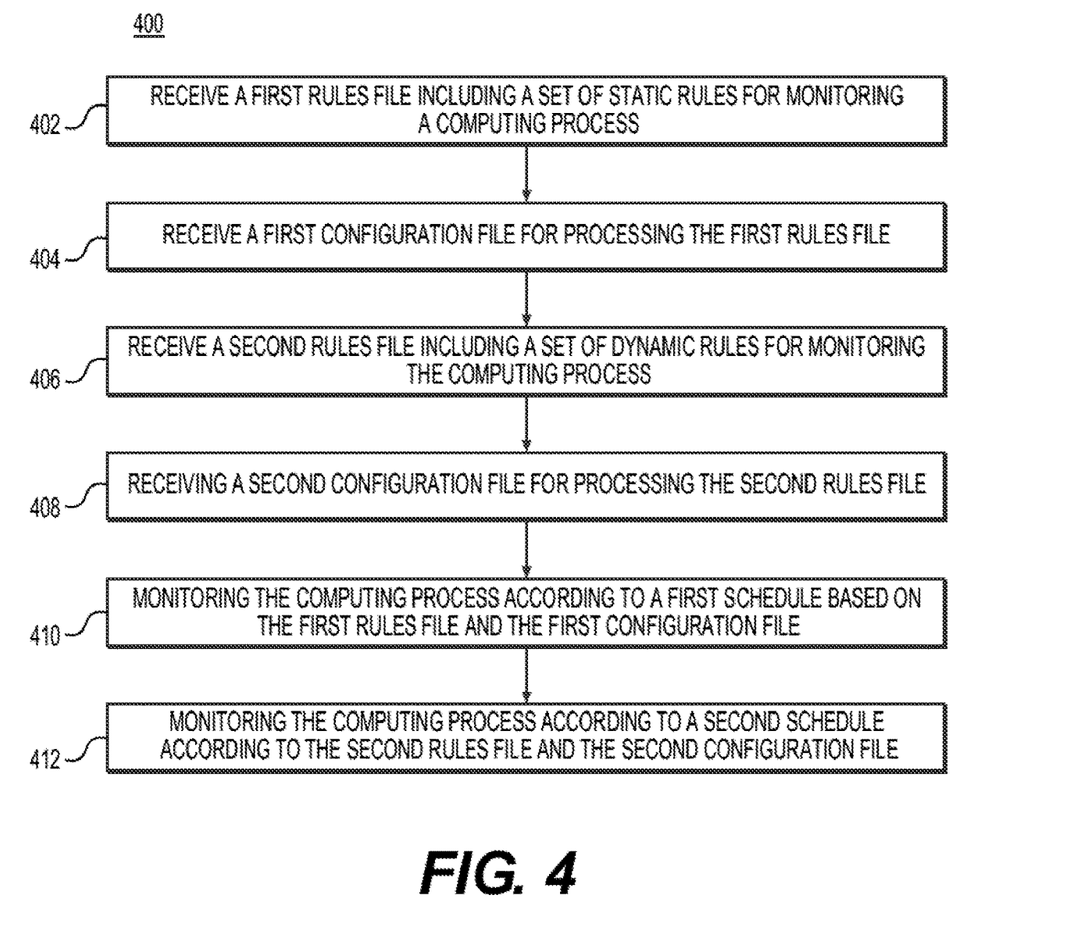
FIG. 4 depicts a flowchart of a method for monitoring computing processes, according to one or more embodiments.

FIG. 4 depicts a flowchart of a method 400 for monitoring a computing process, according to one or more embodiments.

Method 400 may begin with step 402 in which the monitoring engine 108 may receive a first rules file including a set of static rules for monitoring a computing process. In step 404, the monitoring engine 108 may receive a first configuration file for processing the first rules file. In some embodiments, the first configuration file may include information indicating one or more sources of data associated with the computing process, one or more filter queries for identifying data associated with the computing process, a location of the first rules file, and an indication for a static rule check based on the first rules file.

In step 406, the monitoring engine 108 may receive a second rules file including a set of dynamic rules for monitoring the computing process. In step 408, the monitoring engine 108 may receive a second configuration file for processing the second rules file. In some embodiments, the second configuration file may include information indicating one or more sources of data associated with the computing process, one or more filter queries for identifying data associated with the computing process, a location of the second rules file, and an indication for a dynamic rule check based on the second rules file.

In step 410, the monitoring engine 108 may monitor the computing process according to a first schedule based on the first rules file and the first configuration file. In some embodiments, the monitoring engine 108 may monitor the computing process according to the first schedule by retrieving a first data set including a plurality of records associated with the computing process based on the one or more sources of data included in the received first configuration file; filtering the retrieved first data set by applying the one or more filter queries included in the received first configuration file to the retrieved data set; applying the set of static rules included in the received first rules file to the filtered first data set; and generating a first output indicating results of applying the set of static rules to the filtered first data set.

In step 412, the monitoring engine 108 may monitor the computing process according to a second schedule based on the second rules file and the second configuration file. In some embodiments, the monitoring engine 108 may monitor the computing process according to the second schedule by retrieving a second data set including a plurality of records associated with the computing process based on the one or more sources of data included in the received second configuration file; filtering the retrieved second data set by applying the one or more filter queries included in the received second configuration file to the retrieved data set; applying the set of dynamic rules included in the received second rules file to the filtered second data set; and generating a second output indicating results of applying the set of dynamic rules to the filtered second data set.

Referring now to the configuration file explained above with reference to FIGS. 1-4, an exemplary configuration file is described in further detail below. In some embodiments, the configuration file may include, for example, a storage service and notification system section. In some embodiments, the storage service and notification system section may be split into up to three subsections: a development subsection, a quality assurance (QA) subsection, and a production subsection. Each subsection may contain identical fields, and the three subsections may be used to handle three different environments, for example, development environment, a quality assurance environment, and a production environment. The storage service and notification system section may be optional if the computing processes will not be monitoring in a separate environment. In some embodiments, monitoring local computing processes may only require a development subsection. Each subsection may include a records bucket and a product decision bucket (e.g., the one or more data sources for data associated with the one or more computing processes). The records bucket may indicate a path to a folder and/or storage service containing the relevant dataset. The production decision bucket may indicate a path to a product decision table to obtain the relevant product identifiers. In some embodiments, a resource name, for example, a notification system resource name, may depend on the environment. Accordingly, each geographical region that the checks are being performed in may require a separate resource name. The configuration file may further include a notification system subject. Similar to the notification system resource name, the subject may depend on both the environment and the geographical region. Accordingly, the subject may also be listed for every region as a regional email.

The configuration file may further include a parsing section. The parsing section may handle whether or not the retrieved data is in raw JSON format. If the retrieved data is in raw JSON format, then a "parse" field may be set to "true." In some embodiments, the parsing section may further indicate a name of a column holding the raw JSON data.

The configuration file may further include a rules and attributes section. The rules and attributes section may provide, for example, a storage service or folder location of the rules files. In some embodiments, the rules and attributes section may further list the attributes and/or provide a path to an attributes file. Further, this section may indicate: (1) whether the checks are static or dynamic (e.g., "type" may be indicated as either "static" or "dynamic"); (2) the format of the data to read (e.g., "format" may be indicated as JSON or "corn. Databricks.spark.avro"), (3) and the period of the data to be read (e.g., "period" indicated as "hourly", "half-daily", or "daily"). In some embodiments, this section may further include optional parameter "lookback" which may determine the number of hours or days before the current day to check. Accordingly, checks may be run at any preferred interval. For example, an interval for static checks may be hourly and once daily for dynamic checks. This section may also include a save bucket or folder location for storing the check results.

The configuration file may further include a segment section. The segment section may include a segment name (e.g., "module") and a SQL list of IDs associated with the segment. In the context of the current disclosure, the segment section may allow for the introduction of a supplemental data source and/or data table which may be used to filter or augment a primary monitored dataset.

Referring now to the rules file explained above with reference to FIGS. 1-4, an exemplary rules file is described in further detail below. In some embodiments, the rules file may begin with three dashes followed by the same segment or identifying tag written for the segment parameter in the configuration file. Following this heading, each rule may be written as a list under an empty bullet. The rules may include a list of static rules or dynamic rules as will be explained in further detail below.

As explained above, static rules may be used for static checks that may check each record individually. Each static rule, except for meta rules as will be explained in further detail below, may be named based on the situation in which the rule will not flag. For example, a "not null" check may flag if the value of the field is null. Additionally, two names may be provided for static rules. The first, termed a "name," may refer to the actual name of the field to be checked. For example, the "name" may be "quantileBucketValue." The second, termed a "flag name," may be what the rule is called in the notification, e.g., an alert email. The flag name may differ from the name if there are more than one rule being applied to a field or if the rule is checking a file included in the attribute file. An exemplary flag name may be "quantileBucketValue_not_null." It is understood that all rules do not need to be reported. This may be the case for meta rules, when the sub-rules should not alert except when combined. For example, a field may only need to be flagged if it is both not null and not inside a range. Adding a "silent" flag to the rule may indicate that the rule will be checked, but will not be included in the alert. In some embodiments, a field may only be checked if it is contained inside an object with another field that has a certain value. This may happen when the last tree in a location is a list. In such embodiments, a "parent name" may be the name of the field that must be found, and "parent" may be the value of the field. In some embodiments, certain rules may be applied to specific dataset structures. For example string rules may be applied to specific dataset structures that contain one or more strings of data in a different format than that verified by other rules. For example, such data structures may include, but are not restricted to, JSON-like data structures such as Scala maps and/or Python dictionaries. In some embodiments, string rules may be utilized as an advanced filtration function on a text/string dump of JSON-like data structures.

In some embodiments, static rules may include a "not null" static rule. This check may ensure that the data has some value. For example, "abc", 1, and 10.0 may be considered not null, while " ", " ", and null would be considered null. The rules file including the "not null" static rule may include any combination of the following parameters: name, flag name, type, parent, parent name, silent, and/or location. The name parameter may indicate the field to check, the flag name parameter may indicate the name of the flag, the type parameter may indicate the type of rule to perform (e.g., the "not null" static rule in this instance), the parent parameter may indicate the value of the parent field, the parent name parameter may indicate the parent field, the silent parameter may indicate whether or not the rule should be silent, and location parameter may indicate the location of the field inside the record.

In some embodiments, static rules may include an "is value" static rule. This checks whether or not the data equals a specific set of values. If the data equals the values, then it will not be flagged. If the data does not equal the values, then it will be flagged. The rules file including the "is value" static rule may include any combination of the following parameters: name, flag name, type, value, parent, parent name, silent, and/or location. The aforementioned parameters have been explained above with the exception of the value parameter. The value parameter may indicate the value to compare to. Further, in this instance, the type parameter may indicate that the "is value" static rule should be performed.

In some embodiments, static rules may include a "not value" static rule. In contrast to the "is value" static rule, the data will not be flagged if the data is not in the values. If the data is in the values, then it will be flagged. The rules file including the "not value" static rule may include any combination of the following parameters: name, flag name, type, value, parent, parent name, silent, and/or location. The aforementioned parameters have been explained above. In this instance, the type parameter may indicate that the "not value" static rule should be performed.

In some embodiments, static rules may include an "integer range" static rule. This checks whether the data is in an integer range and also makes an "is value" check. The "integer range" static rule allows for command such as "flag if not between 0 to 100, and if the data is not 998 or 999." In some embodiments, the "integer range" static rule takes the floor of any floating point numbers. The rules file including the "integer range" static rule may include any combination of the following parameters: name, flag name, type, range, value, greater, allow null, parent, parent name, silent, and/or location. The aforementioned parameters have been explained above with the exception of the following: the range parameter may indicate the range to check if in, the greater parameter may indicate that the value should be greater than range, if range is a single value, and the allow null parameter may indicate not to flag if the value is null. In this instance, the type parameter may indicate that the "integer range" static rule should be performed.

In some embodiments, static rules may include a "real range" static rule. The "real range" static rule operates in the same manner as the "integer range" static rule, but on a set of real numbers instead of integers. The rules file including the "real range" static rule may include any combination of the following parameters: name, flag name, type, range, value, less than, parent, parent name, silent, and/or location. The aforementioned parameters have been explained above with the exception of the less than parameter which may indicate that the value should be less than the range, if range is a single value. In this instance, the type parameter may indicate that the "real range" static rule should be performed.

In some embodiments, static rules may include a "not empty" static rule. The "not empty" static rule checks if a list contains any elements. If "excludes" and "excludes name" are specified, the "not empty" static rule may ignore objects which have a field ("excludes name") that matches the value of "excludes." The rules file including the "not empty" static rule may include any combination of the following parameters: name, flag name, type, excludes, excludes name, parent, parent name, silent, and/or location. The aforementioned parameters have been explained above with the exception of the following: the excludes parameter that indicates the value of the field for objects to be ignored and the excludes name parameter that indicates the name of the field for objects to be ignored. In this instance, the type parameter may indicate that the "not empty" static rule should be performed.

In some embodiments, static rules may include a "string is null" static rule. The "string is null" static rule checks if a string value is equal to the empty string. It is understood that this is a string rule, and should be used with specific dataset structures as described above. The rules file including the "string is null" static rule may include any combination of the following parameters: name, flag name, type, location name, parent segment, parent folder, string location, subvalue, parent, parent name, silent, and/or location. The aforementioned parameters have been explained above with the exception of the following: the location name parameter that indicates the name of the folder inside the string that contains the field, the parent segment parameter that indicates the segment that must be inside the parent folder, the parent folder parameter that indicates the folder that contains the string inside the location, the string location parameter that indicates the location of the field inside the string, and the subvalue parameter that indicates whether or not the field is a subvalue of its location. In this instance, the type parameter may indicate that the "string is null" static rule should be performed.

In some embodiments, static rules may include "string is not null" static rule. The "string is not null" static rule is the inverse of "string is null" static rule and checks if the value is not null. It is understood that this is also a string rule, and should be used with specific dataset structures as described above. The rules file including the "string is not null" static rule may include any combination of the following parameters: name, flag name, type, location name, parent segment, parent folder, string location, subvalue, parent, parent name, silent, and/or location. The aforementioned parameters have been explained above. In this instance, the type parameter may indicate that the "string is not null" static rule should be performed.

In some embodiments, static rules may include a "string is value" static rule. The "string is value" static rule checks if the value is equal to one of the values in the provided list. It is understood that this "string is value" static rule may be used for checking against real numbers. It is understood that this is also a string rule, and should be used with specific dataset structures as described above. The rules file including the "string is value" static rule may include any combination of the following parameters: name, flag name, type, value, location name, parent segment, parent folder, string location, subvalue, parent, parent name, silent, and/or location. The aforementioned parameters have been explained above. In this instance, the type parameter may indicate that the "string is value" static rule should be performed.

In some embodiments, static rules may include a "string real range" static rule. The "string real range" static rule checks if the value is inside a range of real numbers. It is understood that this is also a string rule, and should be used with specific dataset structures as described above. The rules file including the "string real range" static rule may include any combination of the following parameters: name, flag name, type, range, location name, parent segment, parent folder, string location, subvalue, parent, silent, and/or location. The aforementioned parameters have been explained above. In this instance, the type parameter may indicate that the "string real range" static rule should be performed.

In some embodiments, static rules may include a "string real value" static rule. The "string real value" static rule operates the same as the "string is value" static rule, but checks if the value is equal to one of a set of real numbers. It is understood that this is also a string rule, and should be used with specific dataset structures as described above. The rules file including the "string real value" static rule may include any combination of the following parameters: name, flag name, type, value, epsilon, location name, parent segment, parent folder, string location, subvalue, parent, silent, and/or location. The aforementioned parameters have been explained above with the exception of the epsilon parameter that indicates how close to get to the real value. In this instance, the type parameter may indicate that the "string real value" static rule should be performed.

In some embodiments, static rules may include a "regex match" static rule. The "regex match" static rule checks whether or not the data follows the pattern mentioned. If the data aligns with the pattern, then it will not be flagged. If the data does not align with the pattern, then it will be flagged. The rules file including the "regex match" static rule may include any combination of the following parameters: name, flag name, type, pattern, parent, parent name, silent, and/or location. The aforementioned parameters have been explained above with the exception of the pattern parameter that indicates the regex pattern (e.g., string or raw string) with quotes. In this instance, the type parameter may indicate that the "regex match" static rule should be performed.

In some embodiments, static rules may include an "is length" static rule. The "is length" static rule checks whether or not the data is of a specific length or not. If the data is of the specific length, then it will not be flagged. If it is not the specific length, it will be flagged. The rules file including the "is length" static rule may include any combination of the following parameters: name, flag name, type, length, parent, parent name, silent, and/or location. The aforementioned parameters have been explained above with the exception of the length parameter that indicates the length to compare to. In this instance, the type parameter may indicate that the "is length" static rule should be performed.

In some embodiments, static rules may include an "is encrypted" static rule. The "is encrypted" static rule checks whether or not the data has at least the basic encryption or not. If the data is of the desired length and has both letters and numbers, then it will not be flagged. If it is not, then it will be flagged. The rules file including the "is encrypted" static rule may include any combination of the following parameters: name, flag name, type, length, parent, parent name, silent, and/or location. The aforementioned parameters have been explained above. In this instance, the type parameter may indicate that the "is encrypted" static rule should be performed.

In some embodiments, static rules may include an "is valid USZip5" static rule. The "is valid USZip5" static rule checks whether or not the data has the 5-digit US zip code format. If the data is of length five and comprises only of numbers, then it will not be flagged. If it is not, it will be flagged. The rules file including the "is valid USZip5" static rule may include any combination of the following parameters: name, flag name, type, parent, parent name, silent, and/or location. The aforementioned parameters have been explained above. In this instance, the type parameter may indicate that the "is valid USZip5" static rule should be performed.

In some embodiments, static rules may include an "is valid date" static rule. The "is valid date" static rule checks whether the date and time field is in the specified format or not. If the data is not in the specified format, it will be flagged. If no format is specified, the format "% Y-% m-% dT % H:% M:% S.% f %z" may be used as default. The rules file including the "is valid date" static rule may include any combination of the following parameters: name, flag name, type, format, location name, parent segment, parent folder, string location, subvalue, parent, parent name, silent, and/or location. The aforementioned parameters have been explained above with the exception of the format parameter that indicates the date format to check. In this instance, the type parameter may indicate that the "is valid date" static rule should be performed.

In some embodiments, static rules may include an "is type" static rule. The "is type" static rule checks if the type of data of the field is of a particular type. For example "alphanumeric" for only alphabets and numbers, "alphabets" for only alphabets, "digits" for only digits, "decimal" for digits with/without a decimal point. This type may be selected using the parameter "type value." The "is type" static rules may flag when the type of the field does not match the type specified in the "type value." The rules file including the "is type" static rule may include any combination of the following parameters: name, flag name, type, type value, parent, parent name, silent, and/or location. The aforementioned parameters have been explained above with the exception of the type value parameter that indicates the type of data expected in the field. In this instance, the type parameter may indicate that the "is type" static rule should be performed.

In some embodiments, static rules may include a "meta" static rule. Meta rules may combine any number of prior rules using a Boolean operator (and, nand, or, nor, xor, and not). For example, "and"ing two rules would only flag if both of the prior rules had flagged. The rules file including the "meta" static rule may include any combination of the following parameters: name, flag name, prior rules, meta type, parent, parent name, silent, and/or location. The aforementioned parameters have been explained above with the exception of the prior rules parameter that indicates the rules to combine and the meta type parameter that indicates the type of meta rule to apply. In this instance, the type parameter may indicate that the "meta" static rule should be performed.

As explained above, dynamic rules may be used for dynamic checks that may be performed by aggregating the data and flagging based on statistical thresholds. The amount of data aggregated may depend on the cadence of which the dynamic checks are run. In some embodiments, all data since the previous dynamic check run may be aggregated. Each dynamic rule may be provided with two names. The first, termed "name," may be the actual name of the field to be checked. For example, the "name" may be "quantileBucketValue." The second, termed "flag name," may be what the rule is referred to in an alert email. The flag name may differ from the name if there is more than one rule being applied to a field or if the rule is checking a file included in the attribute file. An exemplary flag name may be "quantileBucketValue_not_null." In some embodiments, a field may only be checked if it is contained inside an object with another field that has a certain value. This may happen when the last tree in a location is a list. In such embodiments, a "parent name" may be the name of the field that must be found, and "parent" may be the value of the field.

Each dynamic rule may depend on thresholds to determine when to flag. When evaluating a dynamic rule, the monitoring engine 108 may compare an evaluated value (e.g., percent special values, actual mean, etc. as will be explained below) to a threshold. If a single value (for example, x) is provided as the threshold, the monitoring engine 108 may create an alert if the evaluated value is not within the range [0, x), i.e., 0<=value<x. The monitoring engine 108 may not alert if the evaluated value is zero, but will if it is the threshold value. If the threshold is two values, the monitoring engine 108 may alert if the evaluated value is not within the range(x, y), i.e., x<value<y. The monitoring engine 108 may alert if the evaluated value is either of the threshold values. These thresholds may differ in type between the dynamic rules, described in further detail below.

In some embodiments, dynamic rules may include a "special value" dynamic rule. The "special value" dynamic rule checks for a set of given values ("defaults") against a set of thresholds. In a "special value" dynamic rule, the monitoring engine 108 may count the percentage of records that have special values. The counted percentage of records may be compared to a percentage threshold. The rules file including the "special value" dynamic rule may include any combination of the following parameters: name, type, default i, threshold i, type i, parent name, parent, location, and/or swap negative. The name parameter may indicate the field to check, the type parameter may indicate the type of rule to perform, the default i parameter may indicate the i-th value to check (there may be more than one value), the threshold i parameter may indicate the threshold for the i-th default (there may be either one or two numbers), the type i parameter may indicate the type to cast the value into for the i-th default, the parent name parameter may indicate the parent field of the field to check, the parent parameter may indicate the value of the parent field, the location parameter may indicate the location of the field inside the record (the location parameter may be a list), and the swap negative parameter may indicate the ability to move any negative sign at the end of a value to the front. In this instance, the type parameter may indicate that the "special value" dynamic rule should be performed.

In some embodiments, dynamic rules may include an "auto-calculated special value" dynamic rule. The "auto-calculated special value" dynamic rule may be similar to the "special value" dynamic rule, but the "auto-calculated special value" dynamic rule may load calculated special values based on data from the past one or more days for the field instead of a predetermined set of thresholds. The monitoring engine 108 may then determine the mean and standard deviation of the calculated special values, and uses the mean and standard deviation to determine a set of thresholds by multiplying the standard deviation by a positive and negative multiplier and adding or subtracting that from the mean. The rules file including the "auto-calculated special value" dynamic rule may include any combination of the following parameters: name, type, default i, default i negative standard deviation, default i positive standard deviation, type i, window, parent name, parent, location, and/or swap negative. The aforementioned parameters have been explained above with the exception of the default i negative standard deviation parameter that indicates the multiplier for the i-th lower threshold, the default i positive standard deviation parameter that indicates the multiplier for the i-th upper threshold, and the window parameter that indicates the number of days to look back. In this instance, the type parameter may indicate that the "auto-calculated special value" dynamic rule should be performed.

In some embodiments, dynamic rules may include a "mean value" dynamic rule. The "mean value" dynamic rule checks the mean of the aggregate against a threshold. The "mean value" dynamic rule may trigger an alert if the mean does not fall within the predetermined threshold. The threshold may represent a desired mean of the field. The rules file including the "mean value" dynamic rule may include any combination of the following parameters: name, type, default, threshold, parent name, parent, location, swap negative, and/or allow null. The aforementioned parameters have been explained above with the exception of the default parameter that indicates the default value of the field, the threshold parameter that indicates the threshold for the mean (can be either one or two numbers), and the allow null parameter that indicates that null may be counted towards the total number of records. In this instance, the type parameter may indicate that the "mean value" dynamic rule should be performed.

In some embodiments, dynamic rules may include an "auto-calculated mean" dynamic rule. The "auto-calculated mean" dynamic rule may be similar to the structure of the "mean value" dynamic rule, but the "auto-calculated mean" dynamic rule may load a calculated mean value based on data from the past one or more days for the field instead of a predetermined threshold. The monitoring engine 108 may then determine the mean and standard deviation of the calculated means, and uses the mean and standard deviation to determine a set of thresholds by multiplying the standard deviation by a positive and negative multiplier and adding or subtracting that from the mean. The rules file including the "auto-calculated mean" dynamic rule may include any combination of the following parameters: name, type, default, negative standard deviation, positive standard deviation, window, parent name, parent, location, swap negative, and/or allow null. The aforementioned parameters have been explained above with the exception of the negative standard deviation parameter that indicates the multiplier for the lower threshold and the positive standard deviation parameter that indicates the multiplier for the upper threshold. In this instance, the type parameter may indicate that the "auto-calculated mean" dynamic rule should be performed.

In some embodiments, dynamic rules may include a "median" dynamic rule. The "median" dynamic rule may determine the median or k-th percentile of a field and checks it against a threshold. The "median" dynamic rule may trigger an alert if the median or k-th percentile does not fall within the threshold, which is may be the desired median or k-th percentile of the field. The "median" dynamic rule may be capable both of determining the standard median, or a given percentile. Each percentile may be between 0 and 1. For example, the 0.75-th percentile may calculate the top 75th percentile of the field. The rules file including the "median" dynamic rule may include any combination of the following parameters: name, type, default, threshold, kth percentile, accuracy, parent name, parent, location, swap negative, and/or allow null. The aforementioned parameters have been explained above with the exception of the threshold parameter that indicates the threshold for the median (which can be either one or two numbers), the kth percentile parameter that indicates the percentile to calculate (the default may be the median), and the accuracy parameter that indicates the accuracy for the algorithm to calculate to (e.g., the default may be exact and range between 0 and 1). In this instance, the type parameter may indicate that the "median" dynamic rule should be performed.

In some embodiments, dynamic rules may include a "total counter" dynamic rule. The "total counter" dynamic rule may count the total number of records present in the dataset. The "total counter" dynamic rule may be triggered if the number of records does not fall within a threshold. The threshold may be the desired number of records. The rules file including the "total counter" dynamic rule may include any combination of the following parameters: name, type, and/or threshold. The aforementioned parameters have been explained above with the exception of the threshold parameter that indicates the threshold for the total count (can be either one or two numbers). In this instance, the type parameter may indicate that the "total counter" dynamic rule should be performed.

In some embodiments, dynamic rules may include a "distinct counter" dynamic rule. The "distinct counter" dynamic rule may count the number of records which have a distinct value for a given field. The "distinct counter" dynamic rule may be triggered if the number of distinct records does not fall within a threshold. The threshold may be the desired number of records. The rules file including the "distinct counter" dynamic rule may include any combination of the following parameters: name, type, threshold, parent name, parent, and/or location. The aforementioned parameters have been explained above with the exception of the threshold parameter that indicates the threshold for the mean (can be either one or two numbers). In this instance, the type parameter may indicate that the "distinct counter" dynamic rule should be performed.

In some embodiments, dynamic rules may include a "special value counter" dynamic rule. The "special value counter" dynamic rule may check for a set of given values ("defaults") against a set of thresholds. The thresholds may be defined by a count that each default comprises of. The "special value counter" dynamic rule may be triggered if the number of records does not fall within the threshold. The threshold may be the desired number of records. The rules file including the "special value counter" dynamic rule may include any combination of the following parameters: name, type, default i, threshold i, parent name, parent, and/or location. The aforementioned parameters have been explained above. In this instance, the type parameter may indicate that the "special value counter" dynamic rule should be performed.

When evaluating a dynamic rule, an optional dependent field may be specified according to some embodiments. The relevant dynamic rule may be evaluated if a dependent value parameter matches the specified value(s). A dependent location parameter for the dependent attribute may be provided for data in a row-based storage format, e.g., Avro data. If there is no match in value or the attribute is missing, the rule may be ignored. It is understood that the dependent field is not considered for "meta check" rules as will be described below.

In some embodiments, "meta checks" dynamic rule may also be provided. The "meta checks" dynamic rule may check the results of other rules. The "meta checks" dynamic rule may be executed in the order the rules appear in the rules file, but after the other rules have run. In some embodiments, each "meta checks" dynamic rule may have an evaluation field, which may be a python snippet that will be run to generate the result of the rule. For example, a rule's evaluation could read as score_default_1 and score_mean, which may combine the results of the two rules. This snippet may be of arbitrary length and may have access to all prior rules, but returns a value of true or false.

The embodiments disclosed herein provide a single configurable platform that solve the following non-limiting requirements for a data driven enterprise: automated configurable validation checks; adaptive validation checks that may self-correct based on historical trends and accounts for drift, thereby avoiding the time consuming requirement for users to manually correct certain threshold (hands-off maintenance of software and infrastructure); a unified platform for data validation and computing process validations; monitor and validate compliance of complex multi-step computing processes; integrated alerting and user interface solution that may be used for both detective and preventive controls based on results of the validations disclosed herein; integrated anomaly detection and notification; combining multiple data validation rules in complex Boolean logic, thereby allowing users to leverage conditional data validation for more complex rules; execute data validation on custom schedules or on demand; execute custom built data validation; join and filter across multiple data sets to perform targeted data validation checks; capability to alert the users through various means, including but not limited to email, slack, and/or ephemeral compute service endpoint; and integration with a dashboarding tool to view the validations performed; simple interactions to perform the data validation through configurations instead of cumbersome code; freedom to execute arbitrary scripts for complex data validation (e.g., in Python) by offering a set of rules that must be applied using the GUI (e.g., the dashboard). The single configurable platform may provide an independent stand-alone platform that does not impact existing application runtimes and resources. For example, the platform may be implemented for existing workflows with minimal impact to the workflow. Additionally, the configurable platform provides scalability to meet any desired data demand. For example, the configurable platform may leverage distributed computing to provide such scalable performance. In contrast, existing big data platforms may be limited to a certain number of compute instances.

Figure 5:
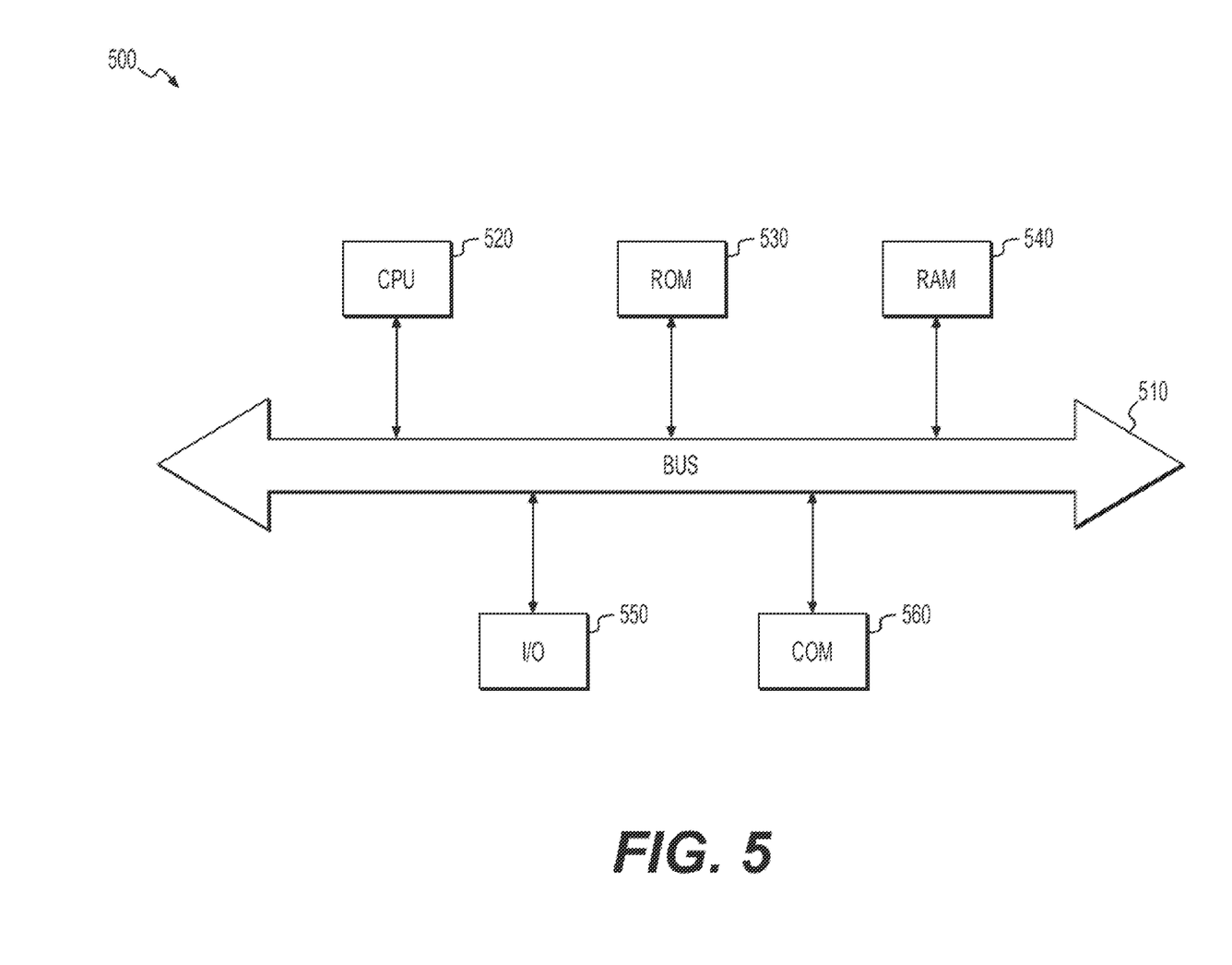
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:
   receiving, by one or more processors, a rules file including a set of rules for monitoring a computing process, wherein the set of rules comprises a set of static rules for performing a static check of the computing process or a set of dynamic rules for performing a dynamic check of the computing process;
   receiving, by the one or more processors, a configuration file for processing the received rules file, wherein the received configuration file includes information indicating one or more sources of data associated with the computing process, one or more filter queries for identifying data associated with the computing process, and a location of the received rules file;

retrieving, by the one or more processors, a data set including a plurality of records associated with the computing process based on the one or more sources of data associated with the computing process included in the received configuration file;

filtering, by the one or more processors, the retrieved data set by applying the one or more filter queries included in the received configuration file to the retrieved data set;

applying, by the one or more processors, the set of rules included in the received rules file to the filtered data set; and generating, by the one or more processors, an output indicating results of applying the set of rules included in the received rules file to the filtered data set.

2. The computer-implemented method of claim 1, further comprising:

combining one or more rules included in the set of rules using a Boolean operation; and applying the combined one or more rules to the filtered data set.

3. The computer-implemented method of claim 1, wherein the set of rules comprises the set of static rules, and wherein applying the set of static rules comprises:

applying the set of static rules to each of the plurality of records included in the retrieved data set; and determining whether each of the plurality of records satisfy the applied set of static rules.

4. The computer-implemented method of claim 3, wherein determining whether each of the plurality of records satisfy the applied set of static rules comprises:

determining whether a specific data field is null;

determining whether the specific data field includes a value that equals a predetermined value; and/or determining whether the specific data field includes a value that falls within a predetermined range.

5. The computer-implemented method of claim 1, wherein the set of rules comprises the set of dynamic rules, and wherein applying the set of dynamic rules comprises:

aggregating data included in the retrieved data set associated with a specific data field;

determining a value based on the aggregated data; and comparing the determined value to at least one predetermined threshold, wherein the at least one predetermined threshold includes a predetermined value or a predetermined range of values.

6. The computer-implemented method of claim 1, wherein generating an output indicating results of applying the set of rules included in the received rules file to the filtered data set comprises:

generating a notification as a result of determining one or more failed rules; and generating a list of the determined one or more failed rules.

7. The computer-implemented method of claim 1, further comprising:

causing display of the generated output via a configurable user interface.

8. The computer-implemented method of claim 1, further comprising:

obtaining historical data associated with the computing process;

training a neural network based on the obtained historical data to determine trends associated with the computing process;

using the trained neural network to determine a trend associated with the computing process;

updating the set of rules based on the determined trend associated with the computing process; and applying the updated set of rules to the filtered data set.

9. The computer-implemented method of claim 1, further comprising:

validating the set of rules included in the rules file; and as a result of successfully validating the set of rules, applying the set of rules to the filtered data set.

10. The computer-implemented method of claim 1, wherein the received configuration file further includes information indicating a format of data to be retrieved from each of the one or more sources of data and/or a schedule indicating when and how many times the data is to be retrieved from each of the one or more sources of data.

11. A computer system comprising:

a data storage device storing processor-readable instructions; and a processor configured to execute the processor-readable instructions to perform a method including:

receiving a rules file including a set of rules for monitoring a computing process, wherein the set of rules comprises a set of static rules for performing a static check of the computing process or a set of dynamic rules for performing a dynamic check of the computing process;

receiving a configuration file for processing the received rules file, wherein the received configuration file includes information indicating one or more sources of data associated with the computing process, one or more filter queries for identifying data associated with the computing process, and a location of the received rules file;

retrieving a data set including a plurality of records associated with the computing process based on the one or more sources of data associated with the computing process included in the received configuration file;

filtering the retrieved data set by applying the one or more filter queries included in the received configuration file to the retrieved data set;

applying the set of rules included in the received rules file to the filtered data set; and generating an output indicating results of applying the set of rules included in the received rules file to the filtered data set.

12. The computer system of claim 11, the method further comprising:

combining one or more rules included in the set of rules using a Boolean operation; and applying the combined one or more rules to the filtered data set.

13. The computer system of claim 11, wherein the set of rules comprises the set of static rules, and wherein applying the set of static rules comprises:

applying the set of static rules to each of the plurality of records included in the retrieved data set; and determining whether each of the plurality of records satisfy the applied set of static rules.

14. The computer system of claim 13, wherein determining whether each of the plurality of records satisfy the applied set of static rules comprises:

determining whether a specific data field is null;

determining whether the specific data field includes a value that equals a predetermined value; and/or determining whether the specific data field includes a value that falls within a predetermined range.

15. The computer system of claim 11, wherein the set of rules comprises the set of dynamic rules, and wherein applying the set of dynamic rules comprises:

aggregating data included in the retrieved data set associated with a specific data field;

determining a value based on the aggregated data; and comparing the determined value to at least one predetermined threshold, wherein the at least one predetermined threshold includes a predetermined value or a predetermined range of values.

16. The computer system of claim 11, wherein generating an output indicating results of applying the set of rules included in the received rules file to the filtered data set comprises:

generating a notification as a result of determining one or more failed rules; and generating a list of the determined one or more failed rules.

17. The computer system of claim 11, the method further comprising:

obtaining historical data associated with the computing process;

training a neural network based on the obtained historical data to determine trends associated with the computing process;

using the trained neural network to determine a trend associated with the computing process;

updating the set of rules based on the determined trend associated with the computing process; and applying the updated set of rules to the filtered data set.

18. The computer system of claim 11, the method further comprising:

validating the set of rules included in the rules file; and as a result of successfully validating the set of rules, applying the set of rules to the filtered data set.

19. The computer system of claim 11, wherein the received configuration file further includes information indicating a format of data to be retrieved from each of the one or more sources of data and/or a schedule indicating when and how many times the data is to be retrieved from each of the one or more sources of data.

20. A computer-implemented method comprising:

receiving, by one or more processors, a first rules file including a set of static rules for monitoring a computing process;

receiving, by the one or more processors, a first configuration file for processing the received first rules file, wherein the received first configuration file includes information indicating one or more sources of data associated with the computing process, one or more filter queries for identifying data associated with the computing process, a location of the received first rules file, and an indication for a static rule check based on the received first rules file;

receiving, by the one or more processors, a second rules file including a set of dynamic rules for monitoring the computing process;

receiving, by the one or more processors, a second configuration file for processing the received second rules file, wherein the received second configuration file includes information indicating one or more sources of data associated with the computing process, one or more filter queries for identifying data associated with the computing process, a location of the received second rules file, and an indication for a dynamic rule check based on the received second rules file;

monitoring, by the one or more processors, the computing process according to a first schedule based on the received first rules file and the received first configuration file by:

retrieving, by the one or more processors, a first data set including a plurality of records associated with the computing process based on the one or more sources of data associated with the computing process included in the received first configuration file;

filtering, by the one or more processors, the retrieved first data set by applying the one or more filter queries included in the received first configuration file to the retrieved first data set;

applying, by the one or more processors, the set of static rules included in the received first rules file to the filtered first data set; and generating, by the one or more processors, a first output indicating results of applying the set of static rules included in the received first rules file to the filtered first data set; and monitoring, by the one or more processors, the computing process according to a second schedule based on the received second rules file and the received second configuration file by:

retrieving, by the one or more processors, a second data set including a plurality of records associated with the computing process based on the one or more sources of data associated with the computing process included in the received second configuration file;

filtering, by the one or more processors, the retrieved second data set by applying the one or more filter queries included in the received second configuration file to the retrieved second data set;

applying, by the one or more processors, the set of dynamic rules included in the received second rules file to the filtered second data set; and generating, by the one or more processors, a second output indicating results of applying the set of dynamic rules included in the received second rules file to the filtered second data set.

* * * * *